United States Patent Office 2,717,905
Patented Sept. 13, 1955

2,717,905

QUATERNARY AMMONIUM ALKYL p-DIALKYL-AMINOBENZOATES

Carl Ziegler, Clementon, N. J., assignor to Merck & Co., Inc., a corporation of New Jersey No Drawing. Application October 7, 1952, Serial No. 313,590

6 Claims. (Cl. 260—472)

This invention relates to new quaternary ammonium derivatives. More particularly, this invention relates to mono-quaternary ammonium compounds, and especially to new mono-quaternary ammonium compounds represented by the general formula:

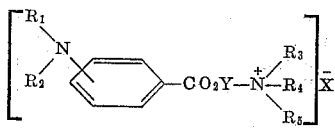

wherein $R_1$, $R_2$, $R_3$, and $R_4$, respectively, is a low molecular weight alkyl radical, and each can represent the same alkyl radical or one or more of the alkyl radicals can be different from the other alkyl radicals represented by these variable elements; $R_5$ is a low molecular weight alkyl radical or aralkyl radical the alkyl portion of which is advantageously a low molecular weight alkyl radical; Y is an alkylene group, either straight or branched chain, containing 2 to 6 carbon atoms; and X is an anion.

The mono-quarternary ammonium compounds of this invention are advantageously prepared by (1) reacting at room temperature, and with or without a solvent, equimolar quantities of the selected bis-tertiary amine and an alkylating or aralkylating agent containing the radicals desired to be attached to the nitrogen atom of the aminoalkyl portion of the compound. Under these reaction conditions mono-quaternization occurs almost to the exclusion of bis-quaternization which does not occur to an appreciable extent at room temperature even with an excess of alkylating or aralkylating agent.

An alternate method (2) for preparing the monoquarternary ammonium compounds of this invention is to react the selected tertiary aminobenzoyl halide, advantageously the para-aminobenzoyl halide, with the desired quaternary ammonium alkanol which can be prepared by alkylating or aralkylating the readily obtainable tertiary aminoalkanol.

The bis-tertiary amines employed in the method (1) described above can be prepared by several methods, such as: (a) reacting a dialkylaminobenzoyl halide with a haloalkanol having an alkylene chain of the type desired for the group Y in the above general formula. This reaction results in a hydrohalide of a haloalkyl ester of dialkylaminobenzoic acid which, upon reaction with a secondary amine, forms the corresponding bis-tertiary amino derivative; (b) reacting a tertiary aminobenzoyl halide with a tertiary aminoalkanol thus forming the corresponding bistertiary amino derivative; (c) esterification of a dialkylamino benzoic acid with the selected tertiary aminoalkanol using a mineral acid as a catalyst thereby obtaining the bis-tertiary amino derivative; (d) reacting a tertiary aminobenzoic anhydride, preferably the paratertiary aminobenzoic anhydride with the selected tertiary aminoalkanol; (e) reacting a tertiary aminobenzoic acid ester, advantageously a lower-alkyl ester of para-tertiary aminobenzoic acid, with a tertiary-aminoalkanol, preferably with heating.

Quaternizing reagents used in any one of the above methods 1 or 2 are, advantageously, alkyl halides or aralkyl halides, preferably an alkyl bromide or an alkyl iodide or benzyl chloride or benzyl bromide or a substituted benzyl halide; an alkyl sulfate as dimethyl sulfate and the like; or an alkyl arylsulfonate, such as methyl para-toluenesulfonate and the like.

An alternate method for making mono-quaternium ammonium salts other than the halides comprises treating the mono-quaternary ammonium halide with silver oxide to produce the mono-quaternary ammonium hydroxide. The excess silver oxide and precipitated silver halide is removed by filtration and the aqueous solution of monoquaternary ammonium hydroxide then is reacted with an appropriate acid to introduce the desired anion. A variety of anions such as the sulfate, phosphate, para-toluenesulfonate, acetate, propionate, benzoate, and in general the carboxylate anion of any organic acid can be introduced by this method.

It is to be noted, however, that variation of the anion has only a minimum effect on the properties of the novel compounds of this invention. When the mono-quaternary ammonium compounds are used as intermediates in the preparation of therapeutic agents, it then is necessary that the anion be non-toxic or is replaced by a non-toxic anion in the end product made therefrom.

The mono-quaternary ammonium compounds of this invention crystallize from various solvents or combination of solvents. In some instances they form solvates or combination of solvates. Thus, upon crystallization of some of the novel compounds from various solvents or solvent combinations, there may be obtained a variety of solvate forms having varying melting points. The amount of a particular solvent included in a solvate of any one of these compounds varies from compound to compound. Because of the tendency of some of the mono-quarternary ammonium compounds to form solvates, their characterization by melting point is dependent upon the method of taking the melting point, the rate of heating, and the initial temperature of the melting point bath. The melting points of these compounds are therefore not reported herein.

The mono-quaternary ammonium compounds of this invention are useful as intermediates in preparing bisquaternary ammonium compounds of the type described in my copending patent application, Serial No. 307,360 filed August 30, 1952, and they are essential intermediates in the preparation of a mixed or unsymmetrical quaternary ammonium compound. For example, the mono-quaternary ammonium compound of this invention can be converted to a bis-quaternary ammonium compound by reaction with an alkylating or aralkylating agent which is not the same as the alkylating or aralkylating agent employed in making the mono-quaternary ammonium compound. For example, 3-trimethylammoniumpropyl para-dimethylaminobenzoate bromide can be reacted with benzyl bromide to form the unsymmetrical bis-quaternary ammonium compound, 3-trimethylammoniumpropyl para-benzyldimethylammonium benzoate dibromide as illustrated by the following reaction formula:

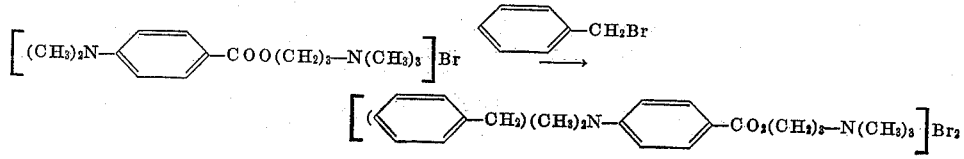

The preferred method for preparing the mono-quaternary ammonium compounds is illustrated in more detail by the following examples. It is to be understood, of course, that the invention is in no wise limited thereby.

Reference is made to my copending patent application serial No. 307,360 for the preparation of the bis-tertiary amino compounds employed as intermediates in the following examples.

All melting points are uncorrected.

*Example 1.—3-trimethylammoniumpropyl para-dimethylaminobenzoate iodide*

Thirteen grams (0.09 mole) of methyl iodide was added to a solution of 7.5 grams (0.03 mole) of 3-dimethylaminopropyl para-dimethylaminobenzoate in 25 mls. of ethanol. A vigorous reaction took place. When the reaction had subsided, the solution was warmed for 5 minutes on the steam bath and cooled. The crystalline product thus formed was removed by filtration yielding 12.3 grams of crude 3-trimethylammoniumproply para-dimethylaminobenzoate melting at 200–205° C. Upon recrystallization from alcohol, 10.9 grams of purified product was obtained melting at 204–206° C.

*Example 2.—3-benzyldimethylammoniumproply para-dimethylaminobenzoate bromide*

One and seven-tenths grams (0.01 mole) of benzyl bromide was added to a solution of 2.5 grams (0.01 mole) of 3-dimethylaminoproply para-dimethylaminobenzoate in 5 mls. of reagent methanol. The solution became warm and was allowed to stand at room temperature for 12 hours. The solution then was diluted with ethyl acetate. This caused an oil to separate which then slowly crystallized. The crystalline product was separated by filtration yielding 4.1 grams of crude 3-benzyldimethylammoniumpropyl para-dimethylaminobenzoate bromide, M. P. 100–115° C. The crude product was recrystallized from a mixture of ethanol and ether.

*Example 3.—3-methyldi-n-butylammoniumpropyl para-dimethylaminobenzoate iodide*

By substituting an equimolecular quantity of 3-di-n-butylaminopropyl para-dimethylaminobenzoate for the bis-tertiary amine employed in Example 1, and following substantially the same procedure described therein, there was obtained a 78% yield of 3-methyldi-n-butylammoniumpropyl para-dimethylaminobenzoate iodide, M. P. 120–122° C.

*Example 4.—3-trimethylammoniumpropyl para-dimethylaminobenzoate bromide*

By substituting an equimolecular quantity of methyl bromide for the methyl iodide employed in Example 1, and following substantially the same procedure described therein, there was obtained a 65% yield of 3-trimethylammoniumpropyl para-dimethylaminobenzoate bromide, M. P. 154–156° C.

An aqueous solution of 3-trimethylammoniumpropyl para-dimethylaminobenzoate bromide, obtained as described in Example 4, was treated with an excess of silver oxide to convert it to the water soluble hydroxide derivative. After filtration, the filtrate was treated with an equimolecular quantity of dimethyl sulfate forming 3-trimethylammoniumpropyl para - dimethylaminobenzoate methyl sulfate.

*Example 5.—2-trimethylammoniumethyl para-dimethylaminobenzoate iodide*

By substituting an equimolecular quantity of 2-dimethylaminoethyl para-dimethylaminobenzoate for the bis-tertiary amine employed in Example 1, and following substantially the same procedure described therein, there was obtained a 68% yield of 2-trimethylammoniumethyl para-dimethylaminobenzoate iodide.

*Example 6.—2-trimethylammoniumethyl para-dimethylaminobenzoate para-toluenesulfonate*

By substiting equimolecular quantities of methyl para-toluenesulfonate and 2-dimethylaminoethyl para-dimethylaminobenzoate respectively for the methyl iodide and bis-tertiary amine employed in Example 1, and following substantially the same procedure described therein there was obtained a 91% yield of 2-trimethylammoniumethyl para-dimethylaminobenzoate para-toluenesulfonate, M. P. 177–180° C.

*Example 7.—4-trimethylammoniumbutyl para-dimethylaminobenzoate iodide*

By substituting an equimolecular quantity of 4-dimethylaminobutyl para-dimethylaminobenzoate for the bis-tertiary amine employed in Example 1, and following substantially the same procedure described therein, there was obtained a 67% yield of 4-trimethylammoniumbutyl para-dimethylaminobenzoate iodide, M. P. 231–233° C.

An aqueous solution of 4-trimethylammoniumbutyl para-dimethylaminobenzoate iodide, obtained as described in Example 7, was treated with an excess of silver oxide to convert it to the water soluble hydroxide derivative. After filtration, the filtrate was treated with an equimolecular quantity of acetic acid forming 4-trimethylammoniumbutyl para-dimethylaminobenzoate acetate.

*Example 8.—4-trimethylammoniumbutyl para-dimethylaminobenzoate bromide*

By substituting an equimolecular quantity of methyl bromide and 4-dimethylaminobutyl para-dimethylaminobenzoate respectively for the methyl iodide and bis-tertiary amine employed in Example 1, and following substantially the same procedure desscribed therein, there was obtained a 46% yield of 4-trimethylammoniumbutyl para-dimethylaminobenzoate bromide, M. P. 235–236° C.

An aqueous solution of 4-trimethylammoniumbutyl para-dimethylaminobenzoate bromide, obtained as described in Example 8, was treated with an excess of silver oxide to convert it to the water soluble hydroxide derivative. After filtration, the filtrate was treated with an equimolecular quantity of benzoic acid forming 4-trimethylammoniumbutyl para-dimethylaminobenzoate benzoate.

*Example 9.—4-benzyldimethylammoniumbutyl para-dimethylaminobenzoate bromide*

By substituting an equimolecular quantity of 4-dimethylaminobutyl para-dimethylaminobenzoate for the bis-tertiary amine employed in Example 2, and following substantially the same procedure described therein, there was obtained a 58% yield of 4-benzyldimethylammoniumbutyl para-dimethylaminobenzoate bromide, M. P. 196–199° C.

*Example 10.—4-trimethylammonium-2-butyl para-dimethylaminobenzoate iodide*

By substituting an equimolecular quantity of 4-dimethylamino-2-butyl para-dimethylaminobenzoate for the bis-tertiary amine employed in Example 1, and following substantially the same procedure described therein, there was obtained a 69% yield of 4-trimethylammonium-2-butyl para-dimethylaminobenzoate iodide.

An aqueous solution of 4-trimethylammonium-2-butyl para-dimethylaminobenzoate iodide, obtained as described in Example 10, was treated with an excess of silver oxide to convert it to the water soluble hydroxide derivative. After filtration, the filtrate was treated with an equimolecular quantity of hydrochloric acid forming 4-trimethylammonium-2-butyl para-dimethylaminobenzoate chloride.

*Example 11.—5 - trimethylammoniumpentyl para - dimethylaminobenzoate iodide.*

By substituting an equimolecular quantity of 5-dimethylaminopentyl para-dimethylaminobenzoate for the bis-tertiary amine employed in Example 1, and following substantially the same procedure described therein, there was obtained a 48% yield of 5-trimethylammoniumpentyl para-dimethylaminobenzoate iodide.

*Example 12.—6 - trimethylammoniumhexyl para - dimethylaminobenzoate iodide*

By substituting an equimolecular quantity of 6-dimethylaminohexyl para-dimethylaminobenzoate for the bis-tertiary amine employed in Example 1, and following substantially the same procedure described therein, there was obtained a 68% yield of 6-trimethylammoniumhexyl para-dimethylaminobenzoate iodide, M. P. 196–198° C.

While the invention has been illustrated by reference to a number of specific embodiments of the invention, it will be apparent that many variations may be made in the specific procedures described and in the particular end products obtained and in the reactants and solvents specifically enumerated.

This invention is limited solely by the scope of the claims attached hereto.

What I claim is:

1. Compounds of the general formula

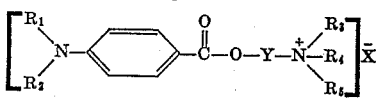

wherein $R_1$, $R_2$, $R_3$ and $R_4$, respectively, is a lower molecular weight alkyl radical; $R_5$ is selected from the group consisting of lower molecular weight alkyl radicals and phenalkyl radicals the alkyl portion of which is derived from a low molecular weight alkyl radical; Y is an alkylene radical having from 2 to 6 carbon atoms and is selected from the group consisting of straight chain alkylene radicals and branched chain alkylene radicals; and X is a non-toxic anion.

2. Compounds of the general formula

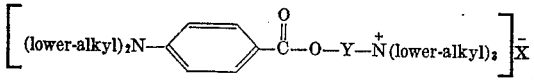

wherein Y is an alkylene radical having from 2 to 6 carbon atoms between the oxygen and nitrogen atoms and is selected from the group consisting of straight chain alkylene radicals and branched chain alkylene radicals; and X is a non-toxic anion.

3. 3 - trimethylammoniumpropyl para - dimethylaminobenzoate bromide.

4. 4-trimethylammoniumbutyl para-dimethylaminobenzoate bromide.

5. 3-benzyldimethylammoniumpropyl para-dimethylaminobenzoate bromide.

6. 4-trimethylammonium-2-butyl para-dimethylaminobenzoate iodide.

References Cited in the file of this patent

UNITED STATES PATENTS

| | | |
|---|---|---|
| 2,406,627 | Parker et al. | Aug. 27, 1946 |
| 2,456,556 | Cope | Dec. 14, 1948 |

FOREIGN PATENTS

| | | |
|---|---|---|
| 437,976 | Germany | Nov. 30, 1946 |

OTHER REFERENCES

Jensen et al., Acta Chemica Scandinavica, 2, 381–384 (1948.)